March 28, 1944.  E. W. FLOSDORF ET AL  2,345,548
METHOD AND APPARATUS FOR DESICCATING SERA,
BIOLOGICALS, AND OTHER MATERIALS
Filed May 24, 1940
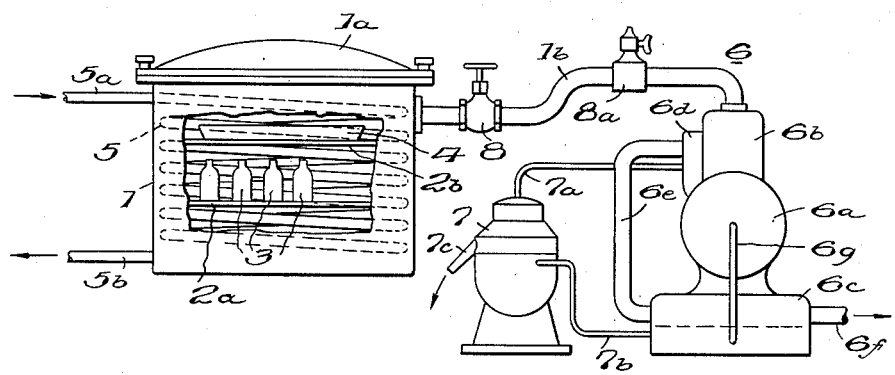
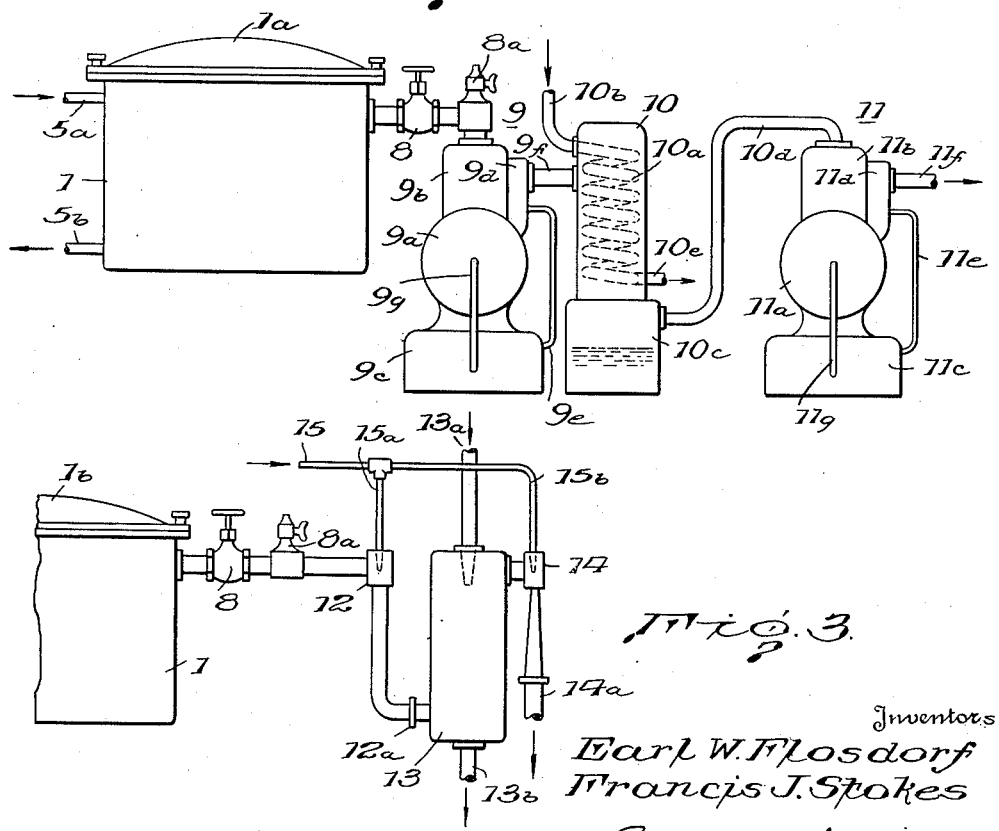
Inventors
Earl W. Flosdorf
Francis J. Stokes
By Ralph B. Stewart
Attorney Patented Mar. 28, 1944

2,345,548

UNITED STATES PATENT OFFICE 2,345,548

METHOD AND APPARATUS FOR DESICCATING SERA, BIOLOGICALS, AND OTHER MATERIALS

Earl W. Flosdorf, Upper Darby, and Francis J. Stokes, Philadelphia, Pa., assignors to F. J. Stokes Machine Company, Philadelphia, Pa., a corporation of Pennsylvania Application May 24, 1940, Serial No. 337,094

5 Claims. (Cl. 34—5)

This invention relates to methods and apparatus for desiccating liquids and semi-solids, and it is especially concerned with a method of desiccation in which the material to be desiccated is first reduced to a frozen state and the moisture is then withdrawn from the frozen mass while still in a frozen state.

It is already known to desiccate sera and other materials by first freezing the liquid sera and then subjecting the frozen mass to a vacuum to cause the water (ice) in the frozen mass to evaporate. The resulting dried product is a porous solid occupying essentially the same volume as the liquid from which it was prepared. Its contents of antibodies and complement suffer no detectable loss in processing. The dried material can be safely stored with a greatly extended duration of potency. For example, the duration of potency of guinea pig complement is extended from the order of a day in the liquid state to that of a year or more in the dried state. The porous product, on addition of distilled water, redissolves with remarkable ease and completeness.

In the desiccating processes heretofore employed, one of the principal problems has been that of preventing water vapor or moisture from reaching the mechanical pump which is employed to exhaust the container. If the pump is not protected from the effects of moisture or water vapor, the desired low degree of vacuum cannot be maintained within the drying chamber and the water vapor cannot be drawn off fast enough to maintain the material in a frozen state.

Various expedients have been resorted to for protecting the vacuum pump from the moisture evaporated from the frozen material. One method involves the use of desiccating materials located within the high vacuum space for absorbing the water vapor evaporated from the material being desiccated. The desiccating material has been placed directly in the drying chamber and in some cases is contained within a separate desiccating chamber connected in the exhaust line between the drying chamber and the vacuum pump. This process involves the use of a considerable amount of desiccating material which must be periodically revitalized or replaced. For example, it requires 100 pounds of desiccant to absorb 1½ pounds of water. This process has the further objection that it is subject to considerable reduction in efficiency as the desiccating material becomes saturated with moisture.

A second method heretofore employed for protecting the vacuum pump against water vapor is to provide for the chilling of a portion of the high vacuum space to a temperature sufficiently low to condense or freeze the water vapor given off by the frozen mass. The arrangements for condensing the vapors usually consist of low temperature condensers inserted in the exhaust line leading from the container of the frozen material to the vacuum pump, and these condensers must be maintained at an extremely low temperature, for example, at a temperature of the order of —70° C. Two or more of such condensers are usually inserted in serial relation between the drying chamber and the vacuum pump. In addition to the low temperature condensers inserted in the exhaust line, it has also been found essential to include a number of drying chambers containing drying material for removing any water vapor which may still remain in the exhaust line after passing through the low temperature condensers and before reaching the exhaust pump. An example of such a system is disclosed in U. S. Patent to Elser No. 1,970,956.

We have discovered that the degree of vacuum which must be maintained in a process of drying from the frozen state depends upon the capacity of the system for eliminating the water or other vapors. We have also found that the absolute pressure does not need to be nearly as low as previously believed, provided the system includes efficient pumping means for eliminating the water vapor at a proper rate. In prior processes, it has been necessary to use very high vacuums, such as pressures of the order of 0.001 mm. (all pressures are given in millimeters of mercury), but we use pressures of a higher order, such as pressures up to 4½ mm. It has heretofore been considered impossible to desiccate directly and solely by means of a mechanical pumping system because the capacity of such pumping system would be far insufficient to take care of the water vapor when expanded to the high degree of vacuum previously considered to be necessary. As an example, if a given rate of water removal is required, a pump of given capacity will produce the required rate at 4½ mm. pressure, but at 0.001 mm. pressure, the increased volume of water vapor at this pressure will require a pump having a capacity of 4500 times the capacity of the first pump, which of course would be prohibitive. Also, after a short interval the pumps would foul by mixing of water with the lubricating and sealing oil and the pumps would no longer be able to maintain this degree of vacuum. We have been able to demonstrate that by operating in a higher zone of pressures, that is at pressures up to 4½ mm., and using properly efficient means as hereinafter described, desiccation from the frozen state may be carried out solely by use of mechanical vapor eliminating means in which the rate of elimination of the vapor is sufficient to maintain the substance being dried in a frozen state.

An object of our invention is to devise a process and apparatus for desiccating materials from a frozen state which does not require the use of low temperature condensers or moisture absorbing desiccants located within the high vacuum space.

A further object is to devise a process and apparatus for desiccating materials from the frozen state which does not require an extremely high vacuum.

Still another object is to devise a process and apparatus for desiccating materials from a frozen state which operates at substantially the same or greater efficiency in the later stages of the process as in the early stages.

A further object is to protect the vacuum pump from any corrosive vapor constituent that may be present during the desiccating process.

In our invention the water vapor is exhausted from the high vacuum space while still in a vaporous state, thereby eliminating the steps of condensing or absorbing the water vapor within the high vacuum space. The moisture is pumped directly from the high vacuum space in vapor form and at a rate sufficient to maintain the material in a frozen state without the aid of additional refrigerating apparatus. Finally the water vapor, after removal from the high vacuum space, is condensed into a liquid, it never being necessary to freeze the water vapor or to absorb it at such extremely low aqueous tensions which otherwise are necessary when such freezing or absorbing is carried out in the high vacuum space as in prior art.

Our invention will be described in connection with the accompanying drawing which illustrates three different arrangements of apparatus for practicing the invention.

Figure 1 is a schematic diagram illustrating one arrangement of apparatus for practicing the invention using a single mechanical pump without employing desiccating materials or low temperature condensers;

Figure 2 is a schematic diagram illustrating another arrangement of apparatus involving two mechanical pumps connected in tandem relation; and Figure 3 is a schematic diagram illustrating a third arrangement of apparatus involving a multiple-jet steam-ejector pump.

Referring to the drawing, a suitable drying chamber represented at 1 is provided with an airtight closure such as cover 1a which may be easily removed for inserting and removing the material to be dried. Where it is desired to desiccate unit quantities of serum, the liquid serum may be placed within glass bottles or vials 3, such as the usual aseptic vials. These vials are placed within the container 1 and remain unstoppered (or stoppered with cotton plugs) during the evacuation process. Where it is desired to desiccate larger quantities of serum or other material, it may be placed within an open pan 4. The containers of material to be desiccated may be supported within the chamber 1 by any suitable means such as a removable stand provided with shelves 2a and 2b.

The chamber 1 may also contain a cooling coil 5 for initially freezing the material to be desiccated, the coil 5 being supplied with a suitable cooling fluid from any suitable source by means of pipe connections 5a and 5b. The coil 5 may not be necessary where the material is initially frozen outside of chamber 1, or where the initial freezing is by rapid evaporation within chamber 1.

The drying chamber 1 is connected to a suitable vacuum pump 6 through a pipe connection 1b. The pump is a mechanical oil-sealed pump of any suitable construction. It may be a reciprocating pump or a rotary pump, but the pump shown in Figure 1 is of the rotary type and consists of a piston chamber 6a containing a rotary piston therein, an inlet valve chamber 6b mounted upon the piston chamber 6a, an oil sump 6c embodied in the base of the pump, an outlet valve chamber 6d, and an exhaust connection 6e leading from the outlet chamber 6d to the upper space within the sump 6c. The exhaust gases are discharged from the sump through the pipe connection 6f. Oil for lubricating and sealing the pump is supplied from the sump 6c to the rotary piston of the pump through a connection 6g, the oil being continuously pumped through the pump by the action of the vacuum created within the pump and is discharged, with the gases, into the outlet valve chamber 6d. The violent agitation of the oil by the gases as the gases and condensate are forced through the discharge valve of the pump causes emulsification of the oil by water and other condensate which is drawn into the pump from the drying chamber 1. In order to purify the oil, a centrifugal separator 7 receives oil from the outlet valve chamber 6d through a connection 7a and returns purified oil to the sump 6c through a connection 7b, the condensate being discharged through a separate outlet 7c. The connection 1b includes a shut-off valve 8 to close off the connection when desired, and a valve 8a to admit air directly to the pump when desired.

Operation of the arrangement shown in Figure 1 is as follows:

In the broadest aspect of the invention, it is immaterial in what manner the material is initially frozen, but it will be assumed first that the material to be desiccated is to be frozen within the drying chamber 1. The material, in suitable containers, is placed within the chamber 1 and the chamber is closed. With cooling fluid flowing through the coil 5 at a suitable low temperature, the material will be frozen in a certain time depending upon the temperature of the cooling fluid. After the material has become frozen solid, the vacuum pump is started and the chamber 1 is exhausted down to a pressure below 4½ mm., for example, to a pressure of the order of 3 mm. After the pump has been started, the cooling fluid may be cut off from coil 5. In the evacuating process the residual air is first drawn off, and, as the pressure within the container 1 decreases, the water vapor begins to be drawn off into the vacuum pump. In the operation of the pump, a charge of water vapor is withdrawn from the drying chamber or from the high vacuum space during each cycle of the pump and this charge is compressed on the high pressure side, whereby a portion of the charge condenses. The condensate, together with the uncondensed portion of the charge, and the lubricating and sealing oil which flows through the pump, is discharged under considerable pressure through the discharge valve of the pump. Since the discharge valves are also usually emersed in oil, the violent agitation of the oil as it is discharged from the pump tends to emulsify the oil with the water condensate or with any other condensate which may pass through the pump. If no provision is made for purifying the oil before it goes back to the pump, the pump will not be able to draw off the water vapor at a sufficient rate to maintain the material in a frozen state. Under such conditions, it would be necessary to continue the operation of the freezing coil 5 and the exhausting operation would be greatly prolonged.

In order to increase the efficiency of the pump for handling the water vapor drawn off from the chamber 1, the partly emulsified oil which is discharged into the outlet valve chamber 6d is supplied through connection 7a to the centrifugal separator 7 where the water is separated from the oil, the water condensate being discharged through the outlet 7c and the purified oil being returned to the sump 6c by connection 7b. In this manner, the lubricating and sealing oil which is supplied to the piston chamber 6a through the connection 6g is substantially free of water or other condensate which would tend to decrease the capacity of the pump. It will be understood that any appreciable amount of water carried into the piston chamber 6a by the lubricating oil will vaporize within the chamber under the action of the vacuum and will thereby prevent the pump from establishing the desired degree of vacuum. It will thus be seen that by a continuous process of supplying the partly emulsified oil from the outlet valve chamber of the pump to the separator and returning the purified oil to the vacuum pump, the pump is maintained at substantially its full operating capacity so that the water vapors may be drawn off from the chamber 1 and discharged therefrom in vapor form. Thus, we eliminate the necessity for condensing the water vapors within the high vacuum space or for absorbing these vapors by absorbent materials located within the high vacuum space.

Where the materials to be desiccated are frozen externally of the drying chamber 1, the coil 5 would not be provided, unless for some reason to maintain the frozen state until the pressure is reduced to below 4.5 mm., but the operation is otherwise as indicated above.

Where it is desired to "self-freeze" the materials within the chamber 1 by the rapid evaporation of the water vapor therefrom, it will be necessary, as a preliminary step, to provide for degassing of the material in order to prevent foaming. This is accomplished by controlling the air valve 8a which admits air to the inlet side of the pump (or shut-off valve 8 may be partly closed) and thereby regulates the degree of vacuum which is maintained within the chamber 1. After the preliminary degassing period, the valve 8a may be completely closed (or valve 8 completely opened) and the material within the drying chamber 1 will be frozen within a relatively short time by the rapid evaporation of water from the material. The material will remain frozen during the remainder of the process, due to the cooling effect of the evaporation of the water from the material being desiccated. The evacuation is continued until the residual moisture content of the material is less than 2% or is of the order of 1%, and in certain cases 0.01 to 0.10 percent. It is not necessary to maintain the chamber 1 at a low temperature, and it may be exposed to ordinary atmospheric temperature.

A second form of pumping arrangement is shown in Figure 2 where elements serving the same function as corresponding elements in Figure 1 are indicated by the same reference numerals. In this arrangement, two ordinary oil-sealed vacuum pumps are connected in tandem relation with a condenser inserted between the two pumps. The pumps may be of any suitable type, but for the purpose of illustration, they are shown of the same type as in Figure 1. The first pump 9 consists of a rotary-piston chamber 9b, an oil sump 9c, an outlet valve chamber 9d, an oil return connection from the outlet valve chamber 9d to the sump 9c, an oil supply connection 9g from the sump 9c to the piston chamber 9a, and the exhaust outlet 9f which is connected to a condenser 10. The condenser 10 is of ordinary construction and may be cooled by ordinary water, such as well water ranging in temperature from 3° to 25° C. It embodies a cooling coil indicated by the dotted line 10a supplied with cooling water introduced at the connection 10b and withdrawn at the connection 10e. A chamber 10c, located at the bottom of the condenser, collects the water condensate which may be withdrawn from the chamber at periodic intervals. The outlet 10d of the condenser 10 is connected to the inlet of a second vacuum pump consisting of a rotary-piston chamber 11a, an inlet valve chamber 11b, an oil sump 11c, an outlet valve chamber 11d, an oil return connection 11e, an oil supply connection 11g and an outlet or exhaust connection 11f.

In the operation of the arrangement shown in Figure 2, the pump 9 pumps water vapor from the chamber 1 at a high vacuum of the order of 3 mm. and discharges this vapor into the condenser 10 at a higher pressure, say of the order of 10 to 50 mm. The second pump 11 draws uncondensed water vapor and residual air from the condenser 10 and discharges the vapor and air at substantially atmospheric pressure through the outlet 11f.

It will be seen that the first pump is not supplied with an oil purifier as in Figure 1, but during operation of Figure 2, the pump 9 is maintained at a temperature above the boiling point of water at the exhaust pressure of this pump. In other words, the temperature of pump 9 is maintained above the boiling point of water at pressures of the order of 10 to 50 mm. The temperature will be well above the boiling point at this range of exhaust pressure if the pump is maintained at 50° C. In this way, any water vapor which comes over into the pump 9 is not condensed by the pump and does not mix with the oil of the pump, but is discharged into the condenser 10 in the form of vapor. In the condenser 10 the greater portion of the water vapor is condensed out by the action of the cooling coil 10a and the remaining vapor is pumped to the atmosphere by pump 11. In this way, the pump 11 is not required to maintain a low vacuum pressure on the input side thereof. Where the ordinary operation of the pump 9 does not involve the generation of enough heat to maintain the pump at the desired temperature, a suitable heater may be installed in the sump of the pump to heat the pump and the oil to the desired temperature, or hot water may be passed through a jacket surrounding the pump.

The arrangement of Figure 2 permits the use of pumps of much smaller capacity for handling a given volume of water vapor than in Figure 1, due to the fact that the first pump need compress the vapors and air but slightly. The second pump need compress only the residual air to atmospheric pressure and condense a small residual amount of water vapor to a liquid.

In Figure 3, we have illustrated a third form of apparatus suitable for carrying out our invention. In this arrangement, the water vapor is pumped from the drying chamber 1 by means of a multiple-jet ejector pump arrangement consisting of two ejector pumps 12 and 14 with a condenser 13 interposed between the pumps. Steam is supplied to the nozzles of the ejector pumps 12 and 14 from a suitable source through connections 15, 15a, and 15b. The exhaust steam and vapors from pump 12 are introduced at 12a into the condenser chamber 13. This condenser chamber is provided with a spray nozzle at the upper end thereof for spraying water within the chamber, the water being supplied from a suitable source by connection 13a. The cooling water and condensate which collects at the bottom of condenser chamber 13 is drawn off at 13b either by a pressure pump, or by the usual column which provides a seal against atmospheric pressure. The residual vapors which are not condensed in the chamber 13 are pumped off by the second ejector pump 14, and the exhaust from the pump 14 is conducted away to atmosphere through the connection 14a. The steam ejector pumps shown in Figure 3 are adequate to maintain the desired low pressure of the order of 3 mm. within the drying chamber 1 and are capable of withdrawing the moisture from the chamber 1 at a rate sufficient to maintain the material in a frozen state. Since the ejector pumps are of the type which do not become fouled by the moisture which is pumped from the drying chamber 1, no difficulty is encountered in maintaining the desired pressure within the chamber 1.

In the event that the vapors drawn off by the vacuum pump from the drying chamber 1 contain a minor constituent of corrosive vapors, such as vapors from acid or alkaline materials, these corrosive vapors may be prevented from reaching the vacuum pump by placing a suitable amount of absorbent material within the chamber 1 or within a separate chamber connected in the discharge line leading to the pump from the chamber 1. For example, sodium hydroxide pellets or similar substances may be used for the removal of hydrogen chloride gas, and meta phosphoric acid or a similar substance may be used for the removal of ammonia gas. Adsorbent materials may also be used for the same purpose. Also, either adsorbent or absorbent materials may be used in the same manner for the removal of constituents of organic vapors which might be present in the vapors drawn off from the frozen material, and which are miscible with the oil of the pump and, therefore, cannot be removed from the oil by the centrifugal separator. For example, aluminum oxide or silicon dioxide may be employed for adsorbing organic vapors and preventing them from reaching the pump. It will be understood that these absorbent and adsorbent materials have a selective affinity for the corrosive vapors, or the organic vapors, and are ineffective to remove any substantial amount of water vapor from the vapors being drawn off.

From the foregoing it will be seen that in the various forms of our invention the pumping means has ample capacity for evaporating the moisture from the frozen mass at a rate sufficient to self-freeze the mass and to maintain the mass in a frozen state during the drying process, and the pumping means also operates to pump the water vapor from the high vacuum space in vapor form and at the same rate that it is evaporated from the frozen mass. In other words, none of the moisture which is evaporated from the frozen mass in the high vacuum space is condensed or absorbed within the high vacuum space.

Our invention makes it possible to reduce to a minimum the amount of water vapor evaporated from the material during the process of self-freezing at a time when the material is still liquid. In other words, due to the large capacity of the pumping means for removing water vapor, the self-freezing stage in the process is accomplished in a minimum amount of time. In certain cases, it is possible to complete the self-freezing step in a few minutes, but with certain materials the period for self-freezing may vary from 1 to 2 hours, including the degassing step. We have found that a pump having a capacity of 50 cubic feet of free air per minute has sufficient capacity for self-freezing one liter of material or for maintaining two liters of frozen material in a frozen state during the desiccating process.

Certain substances, such as many varieties of viruses, including influenza virus, deteriorate in the later stages of drying when the amount of residual moisture is still well above 2%, but below the point where the evaporation will keep the temperature of the material below 0° C. At this point the substance has been dried sufficiently so that it will not necessarily be molten or in liquid form, even though its temperature is above 0° C. In order to prevent such deterioration, during the later stages, the material may be cooled by external cooling from the coil 5 to maintain the temperature below 0° C., preferably below −10° C., until no further drying takes place when the residual moisture will be of the order of 2 to 8%, and then the external cooling is cut off and the evacuation may be continued while the temperature of the material is allowed to slowly rise to 20° C., or above. During the gradual rise of temperature, any residual moisture still remaining may be evaporated. By this procedure products of much greater potency are obtained because the degree of deterioration which takes place during the later stages of drying is materially reduced over that obtained in prior processes. The product resulting from this procedure is also found to be very stable.

In the foregoing description, we have found it convenient to refer to water as being the vaporizable liquid, but the invention may be used for drying solutions of other liquids, such as solutions of alcohols or other organic solutions instead of water solutions.

While our invention is particularly useful for the drying of liquid biological materials, it will be understood that it may be employed for drying other materials such as pharmaceuticals, and food products, such as milk, orange juice, soups and the like. In the appended claims the term "liquid and semi-solid material" is to be interpreted to include all such materials.

What we claim is:

1. The process of desiccating biological materials, such as viruses, to increase the potency and stability thereof, which comprises freezing a solution of the virus to a solid mass, subjecting the frozen mass to vacuum in a sealed space to cause evaporation of the frozen liquid therefrom, maintaining the mass at a temperature below 0° C. by external cooling until the residual moisture content is of the order of 2% to 8%, then allowing the mass to rise to a temperature of the order of 20° C. while maintaining the mass under vacuum.

2. The process of desiccating biological materials, such as viruses, to increase the potency and stability thereof, which comprises freezing a solution of the virus to a solid mass, subjecting the frozen mass to vacuum in a sealed space to cause evaporation of the frozen liquid therefrom, externally cooling the mass to maintain the same in a frozen state until the residual moisture content is of the order of 2% to 8%, then cutting off the external cooling and allowing the mass to rise to a temperature of the order of 20° C. while maintaining the mass under vacuum.

3. Apparatus for desiccating liquid of semi-solid material comprising, in combination, a vapor-tight drying chamber for enclosing said material, an oil-sealed vacuum pump directly connected to said chamber for evacuating the same, a condensing chamber for receiving the exhaust from said vacuum pump, means for cooling said condensing chamber to a temperature of the order of 3 to 25° C., a second vacuum pump connected to said condensing chamber for pumping the residual gas and vapor from said condensing chamber to atmosphere and for maintaining said condensing chamber at a pressure of the order of 10 to 50 mm. of mercury, said first pump being maintained at a temperature of the order of 50° C. during operation thereof.

4. The process of desiccating substances of the class consisting of biological materials, pharmaceuticals and food products which consists in freezing the material to a solid mass, subjecting the frozen mass to a vacuum in a vapor-tight sealed space to cause evaporation of moisture from the frozen mass, and pumping the moisture out of said sealed space in vapor form without condensing it or absorbing it in a desiccant within said space at the same rate as it is evaporated from the frozen mass.

5. The process of desiccating substances of the class consisting of biologicals, pharmaceuticals and food products which consists in subjecting such materials while in a frozen state to vaccum in a high vacuum space to cause evaporation of moisture from the frozen mass, and pumping the moisture out of said high vacuum space in vapor form without condensing it or absorbing it in a desiccant within said space as fast as it is produced.

EARL W. FLOSDORF.
F. J. STOKES.